United States Patent Office 3,105,098
Patented Sept. 24, 1963

3,105,098
PROCESS FOR THE PREPARATION OF ACETYLENIC ALCOHOLS
Russell K. Frantz, Gillette, N.J., assignor to Air Reduction Company, Incorporated, New York, N.Y., a corporation of New York
No Drawing. Filed Dec. 29, 1959, Ser. No. 862,472
3 Claims. (Cl. 260—635)

This invention relates to the preparation of alkynols. More specifically, this invention relates to a catalytic process for the preparation of alkynols wherein acetylene is reacted with a ketone in the presence of a catalyst under reaction conditions.

Alkynols have been prepared by condensing acetylene and a ketone in the presence of many condensing agents. One of the condensing agents which has been employed is a finely powdered potassium hydroxide dispersed in solvents such as benzene, ethers, acetals, and amines. Other condensing agents which have been used are alkali metal acetylides, alkaline metal alkoxides, calcium carbide, and heavy metal acetylides. Many disadvantages have been encountered in utilizing the known condensing agents, some of these disadvantages are: firstly, the necessity of employing relatively large amounts of condensing agents which are difficult to recover in a form suitable for reuse and secondly, the employment of large quantities of solvents which may be lost and the use of which renders the separation of the product from the solvents a difficult procedure.

It is, therefore, an object of the present invention to provide a catalyst to be utilized in preparing alkynols which catalyst possesses relatively long catalyst life.

A further object of this invention is to provide an improved continuous method for preparing alkynols.

Additional objects and advantages of this invention, if not specifically set forth, will become apparent to one skilled in the art during the course of the following description.

Generally, the present invention comprises reacting acetylene or a homologue of acetylene with a ketone in the presence of a catalyst consisting of the cyanide form of an anion exchange resin under reaction conditions.

In a preferred embodiment, the present invention comprises charging a reaction zone with the cyanide form of an anion exchange resin, saturating a ketone with acetylene and passing the acetylene saturated ketone through the reaction zone under reaction conditions to form alkynols. The reaction may be performed in either a batch or a continuous fashion. It is possible to conduct the present process in a continuous fashion due to the relatively long effective life of the present catalyst. It has been found that the percent conversion from the ketone to an alkynol where the continuous process is employed is superior to the percent conversion where the batch process is utilized. One reason for the superiority of the continuous process is most likely due to the continual removal of the product from the reaction zone as rapidly as it is formed, thus, decreasing the opportunity for decomposition of the product.

The alkynols which are prepared by the present method may be characterized by the formula:

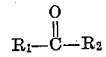

wherein $R_1$ and $R_2$ are members selected from the group consisting of alkyl radicals, cycloalkyl radicals, aryl radicals, aralkyl radicals and substituted alkyl radicals such as hydroxy alkyls and $R_3$ may be either hydrogen or hydrocarbon. Acetylene or a homologue of acetylene which contains a reactant hydrogen represented by the formula:

$$R_3C \equiv CH$$

wherein $R_3$ is hydrogen or hydrocarbon, may be employed in forming the alkynols of the present invention.

The ketones which may be utilized in the present invention possess a general formula:

wherein $R_1$ and $R_2$ are members selected from the group consisting of alkyl radicals, cycloalkyl radicals, aryl radicals, aralkyl radicals, and substituted alkyl radicals such as hydroxy alkyls. Examples of suitable ketones which are employed in practicing the present invention are acetone, methyl ethyl ketone, cyclohexanone, acetophenone, and methyl hydroxy butanone.

The reaction of the present invention may be represented by the equation:

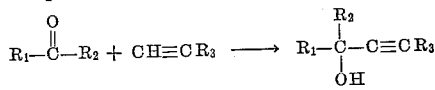

wherein $R_1$, $R_2$ and $R_3$ are radicals as defined above. The ratio of acetylene to ketone of about 1 mole of acetylene to 0.5 to 3 moles of ketone may be employed in the preparation of alkynols of the present invention. In a preferred embodiment of this invention approximately equimolar proportions of acetylene and ketone are utilized.

The catalyst employed in the present invention is the cyanide form of an anion exchange resin. The preferred anion exchange resin is formed from a quaternary ammonium salt anion exchange resin, referred to as a strongly basic resin. The anion exchange resin is composed of a cross-linked polymer consisting of a major portion of an aromatic monovinyl hydrocarbon such as styrene and a lesser amount of a divinyl hydrocarbon such as divinyl benzene reacted with a tertiary amine. The quaternary ammonium salt anion exchange resins are typically sold in the form of chloride salts under the tradenames "Amberlite IRA-400," "Amberlite IRA-410," "Dowex 1," "Dowex 2," and "DeAcedite FF."

In order to prepare the catalyst of the present invention, it is necessary to convent the chloride form of the anion exchange resin to the cyanide form of the resin. This may be accomplished by adding a cyanide salt such as sodium cyanide to the chloride form of the anion exchange resin. A preferred method for converting of the anion exchange resin from the chloride to the cyanide form consists of placing the anion exchange resin in a glass column and feeding a 5 percent aqueous solution of sodium cyanide upwards through the resin while agitating the resin by means of a wire during the initial wetting to assure the removal of adsorbed air from the resin. The effluent solution is tested qualitatively for the presence of chloride ion by adding 5 cc. of the effluent solution to 20 cc. of 30% formaldehyde, digesting for 15–30 minutes, acidifying with acetic acid and adding silver nitrate. The resin is treated with the 5% aqueous solution of sodium cyanide until a negative test for the chloride ion is obtained, this will occur when no turbidity is produced upon the addition of silver nitrate. At this point the resin is converted to the cyanide form and distilled water may be passed through the resin until the effluent is neutral. The resin in this form will contain about 61 to 63 percent water. This wet resin may be washed with a solvent such as absolute ethanol or acetone and the resin pumped dry under vacuum to give a resin containing from 15 to 40 percent water referred to as a dry resin. It has been found that there is generally no advantage in utilizing the resin in the dry form.

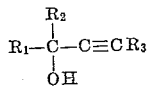

In fact, it is preferred to utilize the resin in the wet form in practicing the present invention.

It has been found that the cyanide form of the anion exchange resin is quite unstable in the presence of air with the cyanide form being converted to the carbonate form. Experiments have revealed that the carbonate form of the anion exchange resin is a very inferior condensing agent for the present reaction. Thus, the cyanide form of the anion exchange resin should be utilized shortly after conversion to the cyanide form and preferably should be converted back to the chloride or other more stable form when it is desired to store the catalyst for long periods of time. Due to the instability of the cyanide form of the anion exchange resin, it is preferred to convert the resin from the chloride form to the cyanide form in the reaction vessel, thus eliminating the chance of contamination by air.

In a preferred embodiment of the present invention the reaction is conducted in a continuous manner. The ketone is fed into a saturator where it is saturated with acetylene under pressure sufficiently high to retain the acetylene in solution; a pressure of from 100 to 250 p.s.i.g. is generally adequate. The acetylene saturated ketone is then fed through a reactor which has been charged with the catalyst, and the reactor is heated to a temperature of from about 30 to 60° C. In operating in a continuous fashion the pressure of the reactor must be somewhat greater than the saturator pressure. A reaction pressure of from about 150 to 1000 p.s.i.g. may be used. It has been found that a pressure of 300 to 900 p.s.i.g. is preferred.

The following is a detailed description of the procedure which was employed in the examples. The ketone was fed by means of a pump from a reservoir to the top of a saturator (42 inches long—1.5 inch diameter) where it was saturated with acetylene under an acetylene pressure which varied from 100 to 250 p.s.i.g. The acetylene pressure depended upon the ratio of acetylene to ketone used with the pressure being maintained such that the acetylene remained in solution. The saturator was packed with ¼ inch stainless steel Raschig rings. The level of the ketone in the saturator was maintained approximately 6 inches from the bottom to allow maximum free space for saturation of the incoming ketone. The ketone saturated with acetylene was fed by means of Milton Roy Proportioning Mini Pump rated at a maximum pressure of 1000 p.s.i.g. to a reactor (42 inches long—0.824 inch diameter) which was heated by an oil circulation system. In order to prevent gas separation and vapor lock prior to entering the reactor feed pump approximately one foot of the U-shaped inlet tube prior to the pump was packed with Dry Ice. Operating pressure in the reactor was maintained by an adjustable back pressure regulator which released the product at a pre-set pressure. The product was condensed in a receiver cooled with Dry Ice and the excess acetylene measured at the exit by a wet test meter.

EXAMPLE 1

In Table I are shown the results for various runs made using the procedure indicated above. The reactor was charged with 188 grams of the cyanide form of "Amberlite IRA–400" anion exchange resin. "Amberlite IRA–400" is a strongly basic anion exchange resin comprised of a polystyrene, cross-linked with divinyl benzene, quaternary amine chloride. The resin as employed in the present process was converted from the chloride form to the cyanide form in the reactor as fully described above. The resin was washed with acetone and dried under vacuum until it contained 17.5% water. An analysis of the resin prior to initiation of the reaction indicated that it contained 3.6 mil equivalents of cyanide per gram of catalyst. The same catalyst was employed in each of the runs with the catalyst remaining in the reactor between runs. The runs, as indicated in Table I, lasted for from 3 to 6 hours. It should be noted that the catalyst was active after the last run was reported in Table I and that no attempt was made to determine the life of the active catalyst. The pressure of the reactor was maintained between 450 and 500 p.s.i.g. The ketone employed was acetone and the product obtained was 2-methyl-3-butyn-2-ol. The percent conversion given in column 6 of Table I was calculated by the following:

$$\text{Conversion} = \frac{\text{moles of methyl butynol}}{\text{moles of acetone feed}} \times 100$$

The percent yield of column 7 was calculated by the following:

$$\text{Yield} = \frac{\text{moles of methyl butynol}}{\text{moles of acetone feed} - \text{moles acetone recovered}} \times 100$$

Table I

| Run No. | Temp., °C. | Feed Rate g. Acetone per g. Catalyst per hour | Time of Run in Hours | Molar Ratio of Acetylene to Acetone | Conversion of Acetone to Methyl Butynol, percent | Yield, percent |
|---|---|---|---|---|---|---|
| 1 | 51–53 | 1.22 | 6 | 1.0 to 1.07 | 31.4 | 85.3 |
| 2 | 44–47 | 1.08 | 3 | 1.0 to 1.08 | 33.3 | 93.0 |
| 3 | 44–47 | 2.40 | 3 | 1.0 to 1.38 | 23.0 | 91.0 |
| 4 | 40–42 | 1.44 | 6 | 1.0 to 1.63 | 26.8 | 87.2 |
| 5 | 40–42 | 1.06 | 3 | 1.0 to 1.04 | 38.2 | 93.5 |
| 6 | 40–42 | 2.8 | 3 | 1.0 to 1.21 | 28.3 | 90.0 |
| 7 | 40–42 | 1.95 | 3 | 1.0 to 1.21 | 29.8 | 89.0 |
| 8 | 30–32 | 2.10 | 3 | 1.0 to 1.57 | 21.1 | 92.0 |
| 9 | 39–41 | 1.05 | 6 | 1.0 to 0.98 | 36.7 | 93.0 |
| 10 | 49–51 | 1.44 | 6 | 1.0 to 0.97 | 48.7 | 91.5 |

It should be noted from Table I that the rate of feed of acetone had a direct bearing on the percent conversion. A comparison of runs 2 and 3 shows that an increase of feed rate from 1.08 to 2.40 decreased the percent conversion by about 10%.

EXAMPLE 2

In Table II are shown the results of various runs made using the procedure indicated above. The reactor was charged with 142 grams of a wet (57% water) cyanide form of "Amberlite IRA–400" anion exchange resin. The resin contained 1.69 mil equivalents of cyanide per gram of catalyst and the same catalyst was utilized in each of the runs. The pressure of the reactor was maintained between 450 and 500 p.s.i.g. The ketone employed was methyl hydroxy butanone and the product produced was substantially 2,3-dimethyl-4-pentyne-2,3-diol, the diol being formed from one mole of methyl hydroxy butanone and one mole of acetylene. A very minor portion of the product consisted of the tetraol which is the condensation product of one mole of acetylene and two moles of methyl hydroxy butanone.

Table II

| Run No. | Reactor Temp., °C. | Feed Rate, g. Acetone per g. Catalyst per hr. | Time of Run in Hours | Molar Ratio of Acetylene to Ketone | Conversion of Ketone to— | | Yield, Percent |
|---|---|---|---|---|---|---|---|
| | | | | | Diol, Percent | Tetraol, Percent | |
| 1 | 39–41 | 3.1 | 6 | 1.0 to 1.32 | 14.1 | 1.7 | 84 |
| 2 | 44–48 | 3.1 | 6 | 1.0 to 1.47 | 20.7 | 2.4 | 89 |
| 3 | 44–46 | 3.1 | 6 | 1.0 to 1.6 | 17.1 | 1.5 | 92 |
| 4 | 49–52 | 2.45 | 6 | 1.0 to 1.5 | 21.0 | 4.0 | 81 |
| 5 | 50–52 | 3.25 | 6 | 1.0 to 1.9 | 25.8 | 3.1 | 94 |

I claim:
1. A process for preparing tertiary acetylenic alcohols comprising condensing acetylene and a ketone having the formula

$$R_1-\underset{\underset{O}{\|}}{C}-R_2$$

where $R_1$ is an alkyl radical and $R_2$ is selected from the group consisting of alkyl and hydroxyalkyl radicals, in the presence of a quaternary ammonium cyanide anion exchange resin at a temperature of from about 30° C. to about 80° C. and under a pressure of from 150 to 1000 p.s.i.g.

2. A process for preparing 2,3-dimethyl-4-pentyne-2,3-diol which comprises saturating 1 mole of methyl hydroxy butanone with approximately 1 mole of acetylene under a pressure sufficient to retain the acetylene in solution, passing said acetylene and methyl hydroxy butanone through a reactor containing a quaternary ammonium cyanide anion exchange resin to produce 2,3-dimethyl-4-pentyne-2,3-diol, said reactor being maintained at a temperature of from about 30° C. to about 80° C. and a pressure of from 300 to 900 p.s.i.g.

3. A process for preparing 2-methyl-3-butyn-2-ol which comprises saturating 1 mole of acetone with approximately 1 mole of acetylene under pressure sufficient to retain the acetylene in solution and passing said acetylene saturated acetone through a reactor containing a quaternary ammonium cyanide anion exchange resin to produce 2-methyl-3-butyn-2-ol, said reaction being maintained at a temperature of from about 30° C. to about 80° C. and a pressure of from about 300 to 900 p.s.i.g.

References Cited in the file of this patent

UNITED STATES PATENTS 2,826,614     Whitfield  ------------- Mar. 11, 1958

OTHER REFERENCES

Nazarov et al.: Chem. Abst., vol. 51, pp. 5019, 5020 (April 10, 1957), 1 page.

"Ion Exchange Resins," Kunin (1958), page 258 (1 page). (Copies in Library.)